Oct. 25, 1960    I. E. FAUGHNDER    2,957,192
POT AND PAN SCRAPER
Filed June 2, 1958
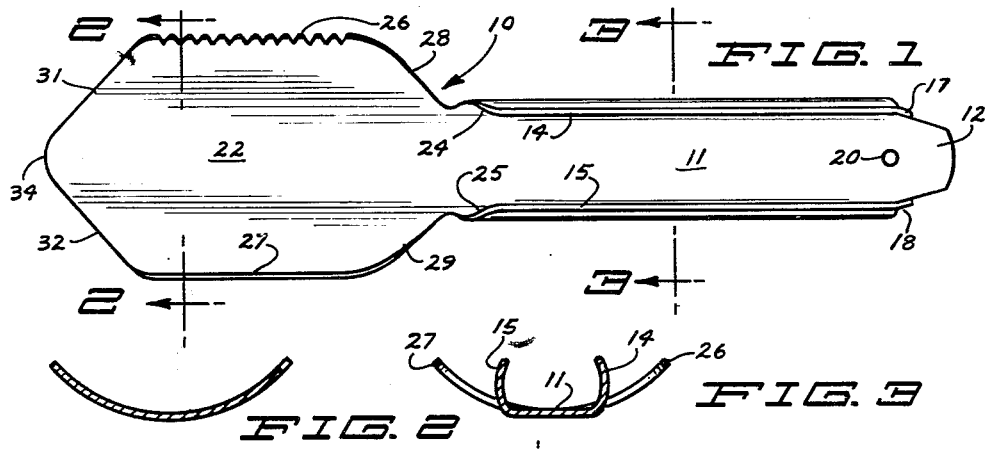
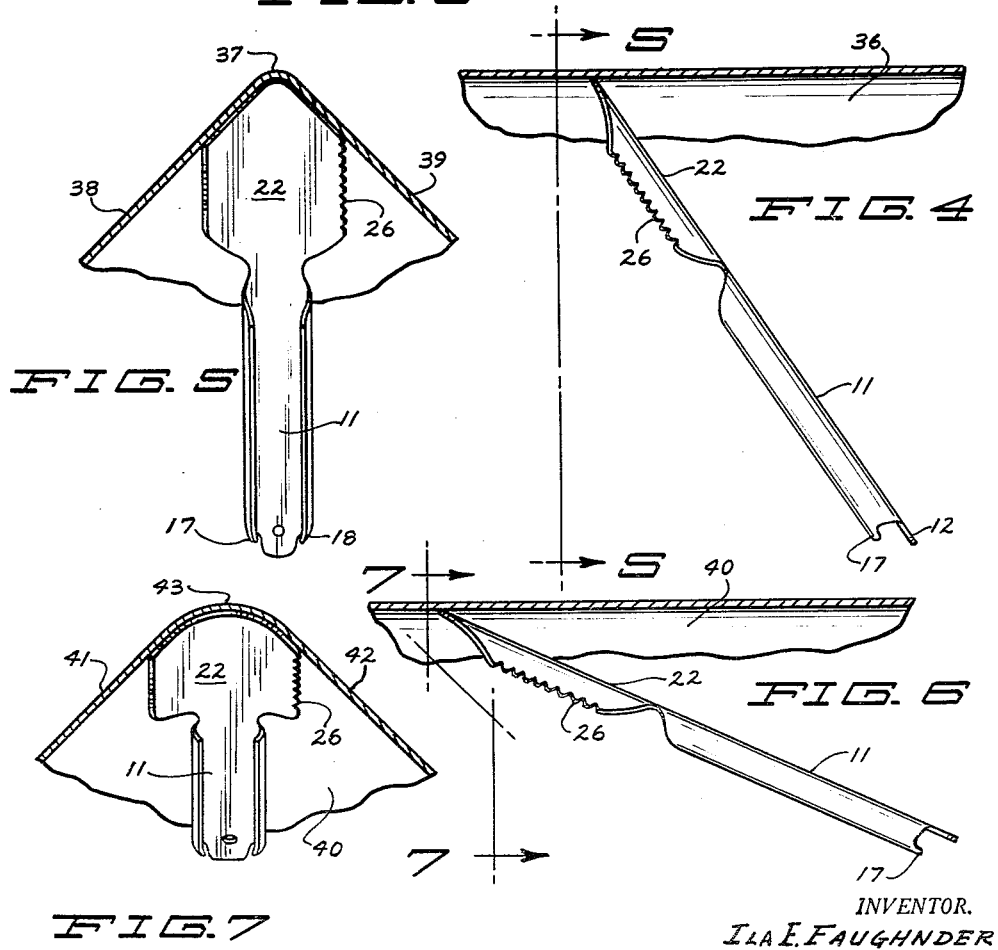
INVENTOR.
ILA E. FAUGHNDER
BY
*Richard Gregory*
ATTORNEYS United States Patent Office 2,957,192
Patented Oct. 25, 1960

2,957,192

POT AND PAN SCRAPER

Ila E. Faughnder, Minneapolis, Minn.
(804 McAllister, San Francisco, Calif.)

Filed June 2, 1958, Ser. No. 739,292

1 Claim. (Cl. 15—236)

This invention relates to a novel construction of a kitchen utensil for scraping pots and pans and particularly the corners thereof. It is particularly desirable to have a single rigid utensil adapted for scraping pots and pans having both right-angled and curved corners at the junction of the bottom and side walls.

It is an object of this invention therefore to provide a utensil for kitchen use for scraping and cleaning both rounded and right-angled corners in said pots and pans.

It is another object of this invention to provide a utensil for kitchen use comprising an integral member having a blade portion having a particularly curved end portion adapted for mating with a right-angled corner for scraping the same when in one position and adapted for mating with a rounded corner to scrape the same when positioned in a different operating position.

It is a further object of this invention to provide a utensil for kitchen use formed of an integral plate member having a substantially rounded handle portion and a blade portion merged into by said handle portion and having a concave convex curvature in vertical cross section and having a rounded angled free end portion adapted to mate with a rounded corner in a pot or pan for scraping the same when held in one operating position and adapted to mate with a right-angled corner in a pot or pan for scraping the same when held in a different operating position.

These and other objects and advantages of the invention will be fully set forth in the following description made in connection with the accompanying drawings in which like reference characters refer to similar parts throughout the several views and in which:

Fig. 1 is a top plan view of applicant's device on an enlarged scale;

Fig. 2 is a view in vertical cross section taken on line 2—2 of Fig. 1 as indicated by the arrows;

Fig. 3 is a view partially in vertical section and partially in elevation taken on line 3—3 of Fig. 1 as indicated by the arrows;

Fig. 4 is a view of applicant's device in side elevation in one operating position;

Fig. 5 is a view of applicant's device in said one operating position shown in front elevation as taken on line 5—5 of Fig. 4 as indicated by the arrows;

Fig. 6 is a view of applicant's device in a second operating position shown in side elevation; and Fig. 7 is a view in front elevation of applicant's device in said second operating position as taken on line 7—7 of Fig. 6 as indicated by the arrows.

Referring to the drawings, applicant's device comprising a kitchen utensil 10 is shown. Applicant's device may be made of various suitable materials of sufficient rigidity and is here indicated as being formed of a plastic sheet-like material as a molded object.

Applicant's utensil 10 has a handle portion of some length comprising a base portion 11 having a very slight curvature in vertical cross section and having a rounded free end portion 12. Said handle portion has upstanding sides 14 and 15 curved toward one another to provide with said base portion 11 a rounded hand gripping portion. Said side portions are recessed at their ends as shown in Figs. 4 and 6 to form projecting lug portions 17 and 18 of small dimension. Said base end portion 12 is shown extending outwardly somewhat further than said leg portions 17 and 18. An aperture 20 is provided for hanging up applicant's device.

Applicant's device has a blade portion integral with said hand portion comprising a base portion 22. Said curved sides 14 and 15 of said handle portion have inclined portions 24 and 25 merging into said blade portion.

Said blade portion has a concavo convex curvature in vertical cross section as indicated in Fig. 2, and has parallel sides 26 and 27 for the greater part of its length. Said sides 26 and 27 have portions 28 and 29 inclined toward each other to merge with said portions 24 and 25 to form a neck portion. Said side 26 as formed in the present embodiment is shown as a serrated edge portion.

Said sides 26 and 27 are here shown having outer ends 31 and 32 inclined toward each other at angles of substantially 45 degrees in relation to the central longitudinal axis of applicant's device. Said ends 31 and 32 merge to form a somewhat rounded outer end 34 which is formed just short of the point of intersection of the extensions of said ends 31 and 32.

In operation, reference is first had to the positioning of applicant's device as shown in Figs. 4 and 5. Applicant's device is here shown in position in a broken away portion of a pan 36 shown for illustrative purposes and as having a right-angled corner 37 formed therein between its bottom 38 and side wall 39. To have its end portion mate with the right-angled corner of pan 36, applicant's device is held in a radial position in relation to the circumference of a round pan or at right angles to the wall surface of a rectangular pan as the case may be. Said end portions 31 and 32 will mate respectively with the side wall and bottom of such a pan. Even in a pan having a right-angled corner between the side wall and bottom, such a corner in practice is not a sharp corner but is somewhat rounded and applicant's device reaches very nicely into such a corner. Applicant's device may also be held at an angle of approximately 45 degrees in relation to its above suggested position and this latter is a preferable position being situated to make it easier to push or shove said device about the entire corner surface of a pan.

Referring to Figs. 6 and 7, a broken portion of a pan 40 is shown having a bottom 41 and a side wall 42 with a well rounded curved corner 43 therebetween. To nicely fit a well rounded corner and mate therewith, applicant's device is positioned at an angle approximately 60 degrees removed from a radial position in a round pan, or at an angle of approximately 30 degrees to the side wall of a rectangular pan. In this position, the rounded end 34 of applicant's device, as shown in Fig. 7, engages the full corner of said pan 40 to scrape the same thoroughly. In this angled position, the sides 31 and 32 of the end portion of applicant's device mate with the wall and extend into to mate with the corner of such a pan, as indicated in Fig. 7.

The serrated edge 26 of applicant's device may be used for scraping the bottoms or side wall of pans very efficiently. For additional utility, the lugs 17 and 18 in combination with the extended base portion 12 of the handle portion of applicant's device makes a convenient bottle cap opener.

Thus it is seen that I have formed a very simply made and efficient all purpose pot and pan scraper adapted to scrape thoroughly both angled and round corners in pans. Applicant's device has proved to be very successful in practice. Applicant's device is nicely formed to do an efficient scraping job in the manner indicated.

It will of course be understood that various changes may be made in the form, details, arrangement and proportions of the parts, without departing from the scope of applicant's invention, which, generally stated, consists in a device capable of carrying out the objects above set forth, in the parts and combinations of parts disclosed and defined in the appended claim.

What is claimed is:

A kitchen utensil for scraping pots and pans comprising a member formed of a strip of substantially rigid plate material having an elongated handle portion having upstanding side portions partially curved toward one another to form a substantially rounded gripping portion, a blade portion formed as a flared out extension of said handle portion and being substantially concavely curved in vertical cross section, said blade and handle portions having a common rectilinear central longitudinal axis, said blade portion having straight parallel side edge portions throughout the central area thereof and having side portions at the free end thereof inclined in directions toward one another at angles substantially at 45 degrees to the central longitudinal axis of said member, and said inclined side portions each having their outer longitudinal edges respectively lying in single planes, said planes respectively being at right angles to the longitudinal axes of said outer edges and said inclined side portions merging at said free end to form a rounded point whereby said free end portion of said blade is adapted to engage respectively the bottoms and sides of pots and pans having therebetween certain different degrees of curvature, said free end portion being adapted to mate with said certain different degrees of curvature by being tilted at angles of certain different degrees by the operator.

References Cited in the file of this patent

UNITED STATES PATENTS

| D. 100,390 | Robison | July 14, 1936 |
| 339,514 | Averill | Apr. 6, 1886 |
| 421,995 | Reibnitz | Feb. 25, 1890 |
| 1,883,726 | Warren | Oct. 18, 1932 |
| 2,262,316 | Brugman | Nov. 11, 1941 |

FOREIGN PATENTS

| 652,612 | Germany | Nov. 3, 1937 |